(12) United States Patent
Wang

(10) Patent No.: US 8,152,139 B2
(45) Date of Patent: Apr. 10, 2012

(54) CHAIN LOAD BINDER (AUSBINDER)

(76) Inventor: Shang Wang, Epping (AU)

( * ) Notice: Subject to any disclaimer, the term of this patent is extended or adjusted under 35 U.S.C. 154(b) by 0 days.

(21) Appl. No.: 11/992,108

(22) PCT Filed: Jun. 16, 2006

(86) PCT No.: PCT/AU2006/000827
§ 371 (c)(1),
(2), (4) Date: Mar. 17, 2008

(87) PCT Pub. No.: WO2007/041752
PCT Pub. Date: Apr. 19, 2007

(65) Prior Publication Data
US 2010/0111634 A1  May 6, 2010

(30) Foreign Application Priority Data
Oct. 12, 2005 (AU) .................. 2005905625

(51) Int. Cl.
*B21F 9/00* (2006.01)
(52) U.S. Cl. ....... 254/237; 254/218; 254/223; 24/69 ST; 24/68 CT
(58) Field of Classification Search .................. 254/217, 254/218, 221, 222, 223, 237; 24/68 CD, 24/68 R, 68 CT, 69 ST, 909; 59/93
See application file for complete search history.

(56) References Cited

U.S. PATENT DOCUMENTS

| | | | | |
|---|---|---|---|---|
| 1,079,700 A | * | 11/1913 | Gibson | 254/218 |
| 2,604,678 A | * | 7/1952 | Mayes | 24/68 CT |
| 4,225,116 A | * | 9/1980 | Laine | 254/247 |
| 4,570,305 A | * | 2/1986 | Smetz et al. | 24/68 CD |
| 4,693,097 A | * | 9/1987 | Rivera | 70/18 |
| 4,753,426 A | * | 6/1988 | Varkala | 269/53 |
| D320,925 S | * | 10/1991 | Barbour et al. | D8/356 |
| 5,775,673 A | * | 7/1998 | Carnes et al. | 254/131 |
| 5,971,178 A | * | 10/1999 | Ratcliff et al. | 212/271 |
| 6,141,836 A | * | 11/2000 | Thornton | 24/270 |
| 6,149,132 A | * | 11/2000 | Ostrobrod | 254/368 |
| 6,530,127 B2 | * | 3/2003 | Curtin et al. | 24/68 CT |
| 7,229,065 B2 | * | 6/2007 | Scott et al. | 254/237 |
| 2002/0026692 A1 | * | 3/2002 | Curtin et al. | 24/68 R |
| 2004/0064921 A1 | * | 4/2004 | Mittleider | 24/68 CT |
| 2005/0263747 A1 | * | 12/2005 | Scott et al. | 254/217 |
| 2008/0235922 A1 | * | 10/2008 | Scott | 24/68 CT |

FOREIGN PATENT DOCUMENTS
DE 3245396 A1 * 6/1984
* cited by examiner

*Primary Examiner* — Emmanuel M Marcelo
(74) *Attorney, Agent, or Firm* — Gina M. Lupino; Laurence C. Bonar

(57) ABSTRACT

There is disclosed a load binder device (10) for tightening, a load, for example during transport on a truck. The device is connected to hooks (80, 102) for securement to suitable anchor points and has an actuating lever (20) and lashing wheels 40. The actuating lever includes a pushing plate (32) which engages ratchet teeth (41) of the lashing wheels to rotate them. A stop plate (56) engages with the ratchet teeth and allows the lashing wheels to be rotated to tighten the load but prevents the wheels from rotating in an opposite direction to release the load. The actuating lever can be released from the lashing wheels by lifting the pushing plate and can be moved into an unlocking position in which cam-like lobes (24), forming part of the lever, force the locking plate into a disengagement position for releasing the lashing wheels to allow the load to be released.

20 Claims, 5 Drawing Sheets

CHAIN LOAD BINDER (AUSBINDER)

FIELD OF THE INVENTION

This invention relates to chain binders for securing chains that are, in turn, used for securing a load, typically on a vehicle such as a truck.

BACKGROUND TO THE INVENTION

It is important, when transporting goods for example on trucks that the goods be properly secured to prevent them from moving around. This is important both with regard to avoiding damage of the goods and to minimizing safety hazards.

A typical known means of securing such loads is a chain and hook combination. Typically, a pair of such combinations is hooked to a load bed on which the goods are disposed, on either side of the goods, and then the two chains are secured to each other. There are various known chain load binders that have been used for this purpose. One such binder is known as "lever type" binder and is illustrated in FIGS. 1 and 2. This binder is provided a lever handle H which is connected, at two spaced-apart pivot points P, to the respective hook mechanisms M. The dimensions of the lever handle H, the spacing between the pivot points P and their respective positions, are such that this device constitutes an over-centre "toggle" device. Thus, the lever handle H is moved in the direction of the arrow A as shown in FIG. 1 to the position as shown in FIG. 2 in which the handle is stably positioned, and in which the distance between the two hooks has been shortened, for tightening the binding applied to the relevant goods.

A disadvantage of such a device is that it can be difficult to use. For example, if the load consists of solid material, then the unyielding nature of such material makes it difficult to move the lever handle H into its stable position as illustrated in FIG. 2. It has been known for operators to attach extension bars to the lever handle to increase the leverage to facilitate moving of the lever handle H. However, especially in view of the high forces involved, this can be unsafe, and indeed has resulted in many accidents occurring.

On the other hand, if the material of the load is soft material, then there may be excessive yield, in which event it may not be possible to achieve a desired tightness of binding of the load.

Another form of binder is as illustrated in FIG. 3. In this figure, hooks K are connected to each other by a pair of bars B which are connected to a central body C, which in turn, is connected to a handle H via a central sprocket S. When the handle H is rotated in a tightening direction, the two bars B are drawn towards the body C, thereby increasing the tightness of the binding on the load. When the handle H is moved in the opposite direction, this releases the tightness of the binding.

Although this type of binder is preferable to the first type mentioned in relation to FIGS. 1 and 2, it is relatively expensive, and is labour intensive as a result of the need to rotate the handle H to release the load.

It is object of the present invention to overcome or ameliorate the disadvantages of the prior art, or to provide a useful alternative.

SUMMARY OF THE INVENTION

According to a first aspect of the invention there is provided a load binder device comprising:
  a first connection means for connecting the device to a first attachment hook;
  a second connection means for connecting the device to a second attachment hook;
  an actuating lever; and
  a ratchet mechanism which is connected to the actuating lever and which interconnects the first and second connection means, the ratchet mechanism having an operational condition in which it is configured to urge the first and second connection means towards each other on movement of the actuating lever in a first direction of movement, and to prevent movement of the first and second connection means apart from each other, and having a released condition in which the first and second connection means are free to move apart from each other,
  wherein the actuating lever is configured to be moved into an unlocking position and thereupon to, cause the ratchet mechanism to be switched from its operational condition to its released condition.

In a preferred embodiment, the load binder device comprises an elongate tensioning element for connecting one of the first and second connection means to the ratchet mechanism, the ratchet mechanism being configured, when in the operational condition, to exert a pulling force on part of the tensioning element to effect said urging of the first and second connection means towards each other.

Preferably, the tensioning element includes a chain.

The ratchet mechanism preferably comprises a chain sprocket for guiding the chain and for exerting said pulling force on said part of the chain.

In a preferred embodiment, the ratchet mechanism comprises:
  a rotatable ratchet wheel having ratchet teeth with driving faces and trailing faces, the device being configured such that rotation of the ratchet wheel in a forward rotational direction effects said urging of the first and second connection means towards each other, and that rotation of the ratchet wheel in an opposite, reverse rotational direction enables the first and second connection means to move apart from each other; and
  a locking element which is movable between an engagement position in which the ratchet mechanism is in its operational condition, and a disengagement position in which the ratchet mechanism is in its released condition, the locking element being biased towards its engagement position,
  wherein the ratchet wheel is configured, on being rotated in said forward rotational direction, for said trailing faces to engage the locking element such that the locking element rides along the trailing faces, thereby moving the locking element towards the disengagement position, and on being urged in said reverse rotational direction, for a driving face to abut the locking element when it is in its engagement position, such that the locking element prevents rotation of the ratchet wheel in said reverse direction.

Preferably, the load binder device comprises a locking element spring for biasing the locking element towards the engagement position.

Preferably, the actuating lever includes an unlocking portion which is configured, when the actuating lever is moved into its unlocking position, to engage a part of the locking element and to move the locking element from its engagement position to its disengagement position.

The unlocking portion is preferably in the form of a cam whereby said part of the locking element constitutes a cam follower.

Preferably, the actuating lever comprises a lever lock which is movable between a first position in which it is configured to engage the teeth of the ratchet wheel and a second position in which it is clear of the teeth, the lever lock being biased towards said first position and being configured, when the lever is moved in said first direction of movement, to engage a said driving face thereby to urge the ratchet wheel in said forward rotational direction, and when the lever is moved in a direction opposite to said first direction of movement, for the trailing faces to engage the lever lock such that the lever lock rides along the trailing faces thereby moving the lever lock towards its second position.

Preferably, the actuating lever has a parked position corresponding to the full extent of movement of the lever in a direction opposite to said one direction of movement, and is configured to be releasably retained in said parked position by engagement of one of said driving faces with said lever lock.

According to a second aspect of the invention, there is provided a load binder comprising:
 a load binder device according to the first aspect of the invention or any preferred embodiment thereof; and
 a pair of hooks, each being connected to a respective one of the first and second connection means.

In this specification, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

BRIEF DESCRIPTION OF THE DRAWINGS

Preferred embodiments of the invention will now described, by way of example only, with reference to the accompanying drawings in which.

DETAILED DESCRIPTION OF PREFERRED EMBODIMENTS

Figure 1:
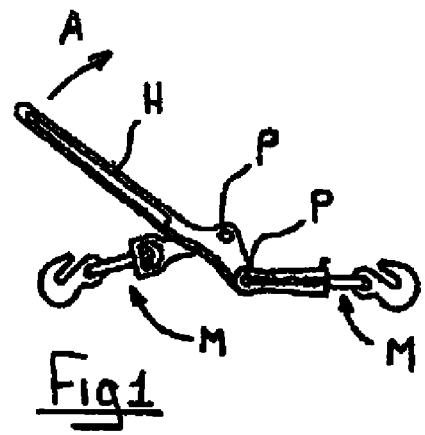
FIGS. 1 and 2 are side views of a prior art chain load binder in two respective conditions of operation.
Figure 2:
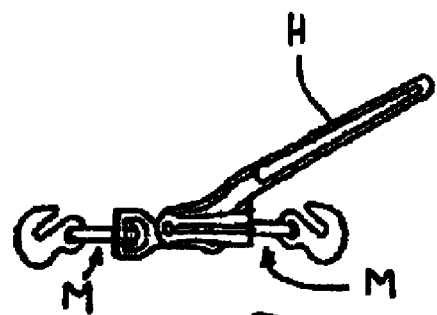
Figure 3:
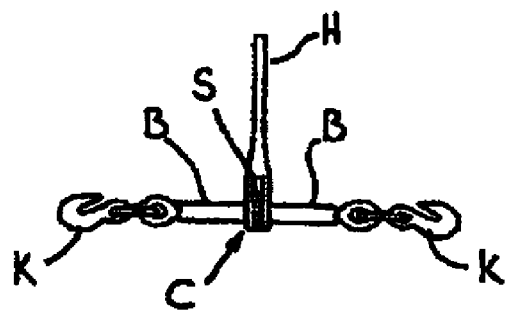
FIG. 3 is a side view of another prior art chain load binder, operating according to a different principle to that of the binder shown in FIGS. 1 and 2.
Figure 4:
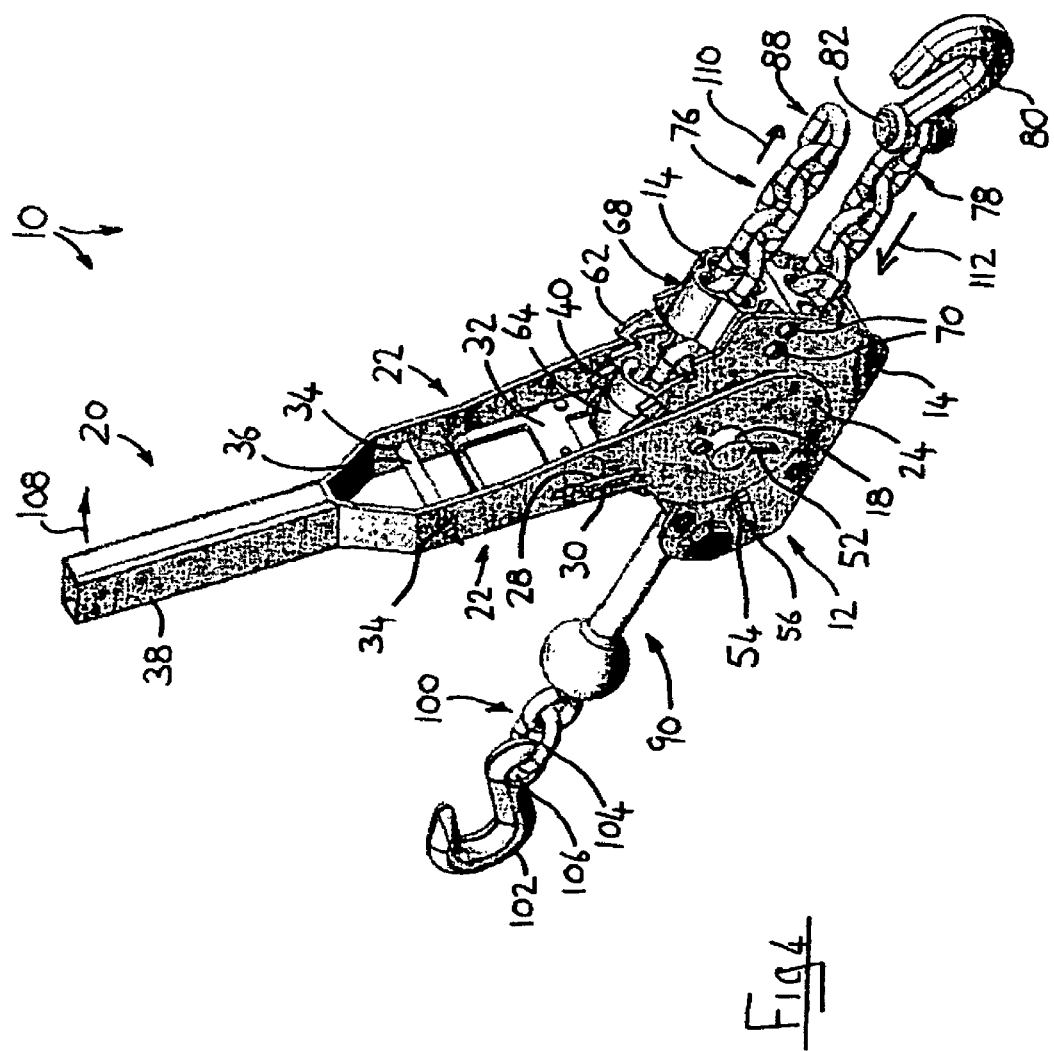
FIG. 4 is a schematic perspective view of a chain load binder according to an embodiment of the invention, shown in a first condition of use.
Figure 5:
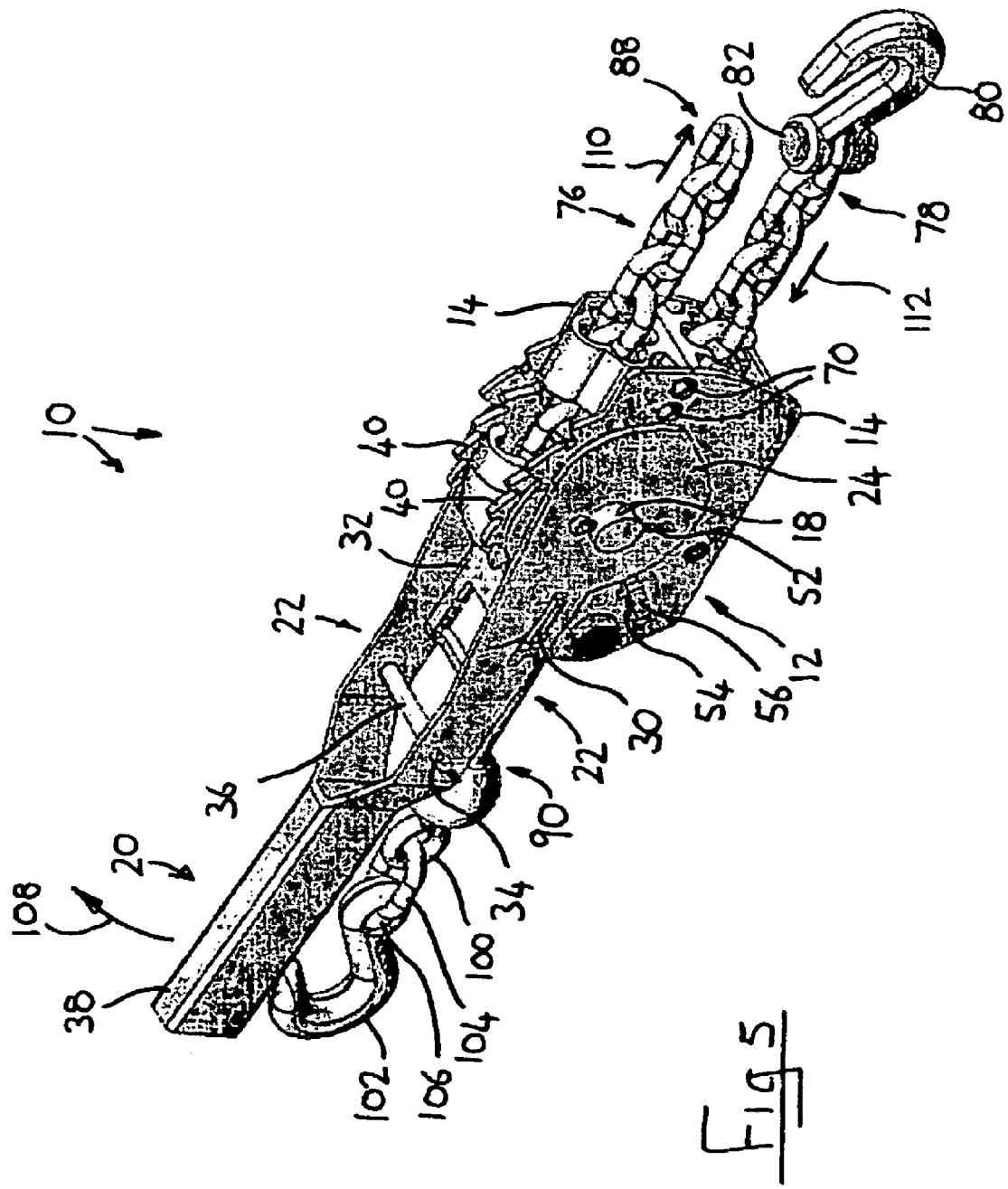
FIG. 5 is a schematic perspective view of the chain load binder of FIG. 4 in a different condition of use.
Figure 6:
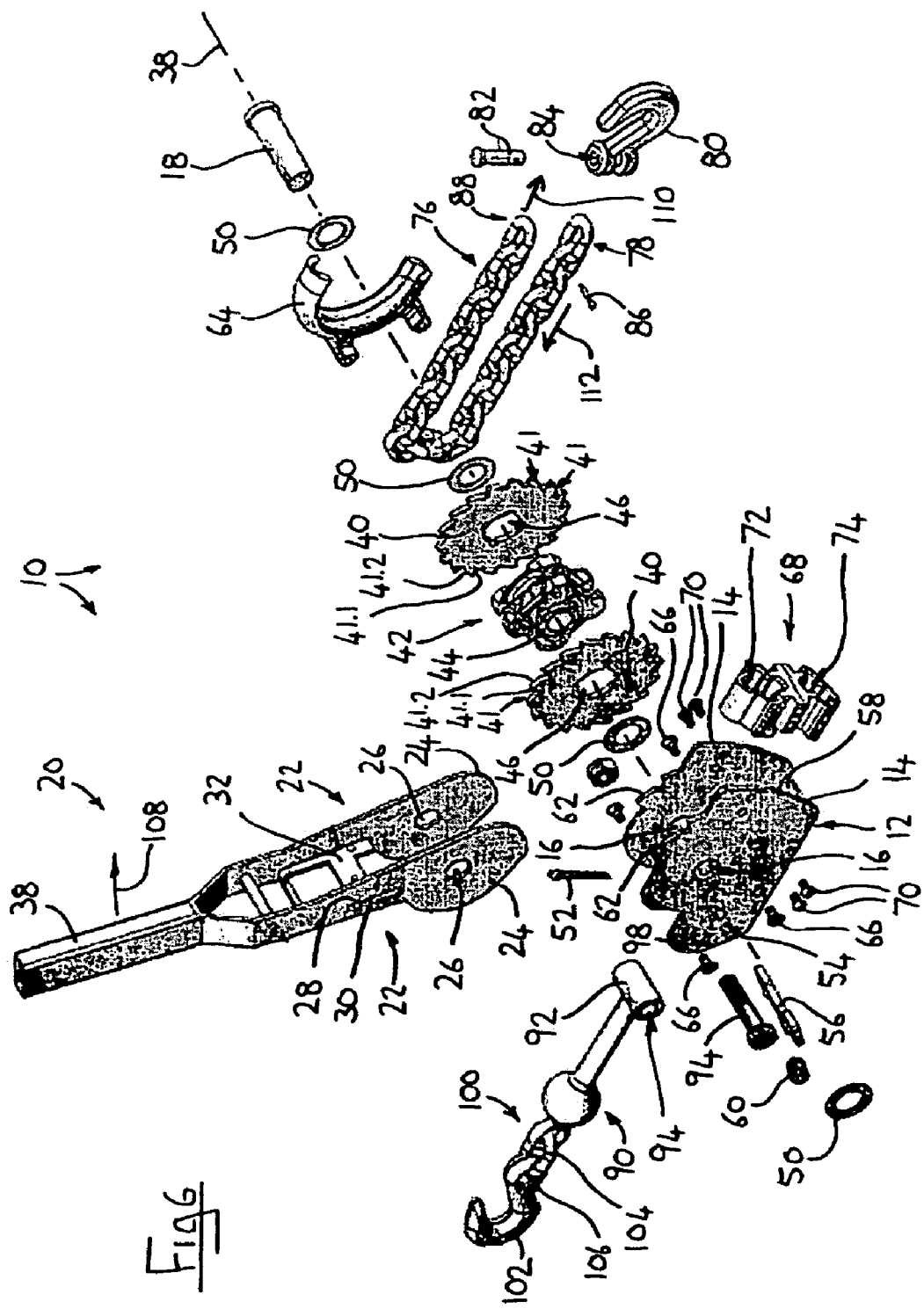
FIG. 6 is an exploded schematic perspective view of the binder as shown in FIG. 4.

Referring to FIGS. 4 to 6, there is shown a chain load binder 10. The binder 10 includes a main body 12 which, in turn, has a pair of opposed plates 14. The plates 14 each define a main pin aperture 16 for receiving a main pin 18.

There is also provided a lever 20 which is forked so as to define a pair of opposed plate-like tines 22. Each tine 22 has a lower lobe 24 with a lobe aperture 26 therein. It will be noted that each of the lobes 24 constitutes a cam, as will be discussed further below.

Each tine 22 further has a narrow slot 28 for accommodating side protrusions 30 of a lever lock in the form of a pushing plate 32. The pushing plate 32 is movable upwards and downwards in the slots 28 and biased downwardly by a spring (not shown).

Each tine 22 has an upper aperture 34, these apertures accommodating a cross bar 36.

The lever 20 also includes a gripping portion 38 with which the tines 22 are integrally joined.

Disposed between the plates 14 are a pair of lashing (ratchet) gears 40, with a chain sprocket 42 disposed between them.

Each lashing gear 40 has a series of circumferentially positioned ratchet teeth 41, each tooth having a flat driving face 41.1 and a tapering, curved, trailing face 41.2.

The chain sprocket 42 has a pair of lateral bosses 44 which are shaped so as to be accommodated in complimentary apertures 46 in the lashing gears 40. The lashing gears 40 and chain sprocket 42 are rotatably mounted to the main body 12 by means of the main pin 18, which passes through the main pin apertures 16.

The bosses 44 and complimentary apertures 46 prevent relative rotation between the lashing gears 40 and chain sprocket 42.

The lever 20 is mounted to the main body 12 with the tines 22 disposed outwardly of the main body, by the main pin 18. Thus, the lever 20, lashing gears 40 and chain sprocket 42 are all rotatable about a common axis 38.

To facilitate free rotation of these components, suitably positioned washers 50 are also provided.

The main pin 18 is held in place by a cotter pin 52.

Each of the plates 14 is also provided with a narrow slot 54, these slots accommodating the opposite ends of a locking element in the form of a stop. plate 56. The stop plate 56 is supported on a base 58 of the main body 12, on top of a coil spring 60 which urges the stop plate 56 in an upward direction, so that the ends of the stop plate 56 engage the upper ends of the narrow slots 54.

At the top of each plate 14, there is provided a stop formation 62.

There is also provided a semi-circular chain guide 64 which is mounted to the main body 12 by chain guide bolts 66.

Similarly, a chain inlet/outlet unit 68 is mounted at the opposite side of the main body 12 by chain inlet/outlet unit bolts 70. The chain inlet/outlet unit 68 has an upper passage 72 and a lower passage 74. A chain stripper 69 is provided and it joined to the chain inlet/outlet unit 68.

A chain 76 extends through the upper passage 72 of the chain inlet/outlet unit 68, around the chain sprocket 42, within the chain guide 64, and through the lower passage 74 of the chain inlet/outlet unit.

The chain inlet/outlet unit 68 is thus suitable for guiding the chain 76 and preventing its twisting. The chain guide 64 ensures that the chain 76 remains firmly engaged with the chain sprocket 42, while the chain stripper 69 minimises sagging of the upper part of the chain 76 adjacent to where it enters the upper passage 72.

One end 78 of the chain 76 (being the end of that portion extending through the lower passage 74) is attached to a hook 80 by means of a hook pin 82 which passes through a hook passage 84 and which is held in place by a cotter pin 86. The other end 88 of the chain 76 is a free end.

A swivel bar 90 having a tubular end portion 92 with a passageway 94 therein is mounted rotatably to the main body 12 by means of a swivel bar bolt 96 which extends through apertures 98 in the plates 14, and through passageway 94 of the tubular end portion 92.

The swivel bar 90 includes an eye portion 100 at an opposite end to the tubular end portion 92, and is attached to a hook 102 by means of a chain link 104 which passes through the eye portion 100 and through a hole 106 in the base of the hook.

The chain load binder 10 can be used for securing; a load (not shown), for example on a truck (also not shown) during transport. To achieve this, the binder 10 is extended over the load and the hooks 80 and 102 are secured to suitable anchor points, for example on the load bed of the truck.

It is necessary to tighten the chain load binder 10 in order to secure the load firmly. This is achieved by moving the lever 20 from the position shown in FIG. 5, in the rotational direction of the arrow 108. As this is done, the pushing plate 32 engages the drive faces 41.1 of the teeth 41 of the lashing gears 40. This causes the lashing gears 40, and hence the chain sprocket 42, to rotate in a rotational direction corresponding to that of the arrow 108.

As the chain sprocket 42 rotates, it causes the chain 76 to be forced in the direction indicated by the arrows 110 and 112, thereby urging the hooks 80 and 102 towards each other, which in turn causes the chain load binder 10 to be tightened over the load.

As the lever 20 is moved in this manner, the curved trailing faces 41.2 of the lashing gears 40 ride over the upper edge of stop plate 56 and force the stop plate to move downwards, to accommodate these curved faces, against the resilience of the coil spring 60. Movement of the stop plate 56 is guided by the narrow slots 54 in the plates 14.

As the lashing gears 40 continue to rotate, each tooth 41 moves clear of the stop plate 56 allowing it to snap back into its original, raised position under the resilience of the coil spring 60. This action is repeated over each of the successive teeth 41 so that the lashing gears 40 together with the stop plate 56 constitute a ratchet mechanism.

Once the lever 20 has moved the full extent of its travel in the direction of the arrow 108, it abuts against the stop formations 62 of the plates 14, preventing further movement of the lever in this direction.

The lever 20 can then be moved in the opposite direction to that indicated by the arrow 108, towards the position indicated in FIG. 5. As the lever 20 is moved in this direction, the pushing plate 32 rides over the curved faces 41.2 of the teeth 41 and is caused to move upwards against the resilience of the spring (not shown) which forces it in a downward direction. The sliding movement of the pushing plate 32 is guided by the slots 28 in which the side protrusions 30 move. It will be appreciated that, as in the case of the stop plate 56, the interaction between the pushing plate 32 and the teeth 41 constitutes a ratchet mechanism.

This back and forth motion of the lever 20 can be repeated thereby causing the lashing gears 40 and chain sprocket 42 to be further rotated in a rotational direction corresponding to that indicated by the arrow 108, thereby continuing to tighten the chain load binder 10 on the load.

When the lever 20 is in the position as indicated in FIG. 5, the engagement of the pushing plate 32 with the drive faces 41.1 of the teeth 41 serves to effectively lock the lever 20 in this position. This may therefore be regarded as a "parked" position of the lever 20.

In order to release the goods that are secured by the chain load binder 10, the lever 20 must be moved to an unlocking position, in the direction of the arrow 108. To achieve this, the pushing plate 32 is lifted by an operator against the resilience of the spring (not shown) while simultaneously moving the lever 20 in the direction of the arrow 108. The cross bar 36 can be used by the operator as a brace to facilitate lifting of the pushing plate 32.

With the pushing plate 32 raised in this manner, it is clear of the teeth 41 of the lashing gears 40, so that the lever 20 can be moved without further rotating the lashing gears 40 and chain sprocket 42. The lashing gears 40 and chain sprocket 42 are prevented, at this stage, from moving in a direction opposite to the arrow 108 by the stop plate 56.

As the lever 20 is continued to be moved in the direction of the arrow 108 as described, the pushing plate 32, in its raised position, not only clears the teeth 41 of the lashing gears 40, but also clears the stop formations 62 of the plates 14.

Once the lever 20 has been moved sufficiently far in the direction of the arrow 108 such that the raised pushing plate 32 clears the stop formations 62, the cam-like lower portions of the lobes 24 come into contact with the stop plate 56, thereby pushing the stop plate downwards relative to the narrow slots 54, against the bias of the coil spring 60. This serves to release the lashing gears 40 from the ratchet effect provided by the stop plate 56, and hence enables the lashing gears 40 and chain sprocket 42 to be freely rotatable in a direction opposite that indicated by the arrow 108. The chain 76 can thus be moved manually in a direction opposite to that indicated by the arrows 110 and 112, to completely release the load.

It will be appreciated that the leverage provided the lever 20 provides a convenient way of tightening the chain load binder 10 on the load. In addition, the cam-like shape of the lobes 24 for releasing the stop plate 56 and hence the chain sprocket 42 provides a convenient and relatively safe way of releasing the load without having to directly move the stop plate. Accordingly, the fingers of the operator can be kept clear of the teeth 41 of the lashing gears 40 during both the tightening and releasing operations.

The materials from which the various components described above are made preferably include hardened, tempered steel which is suitable to withstand the operational forces that are applied. Surfaces are preferably either zinc-plated or have painted finishes.

The dimensions of the particular chain load binder 10 and its components will depend on the operational necessities and, in particular, the size of the chain 76.

The chain load binder 10 according to the invention provides a device that is simple and quick to use, relatively cost-effective, and safe when compared with the prior art. While it will typically be used on a truck, it may alternatively be used in other modes of transport, such as a ship.

Although the invention is described above with reference to specific embodiments, it will be appreciated by those skilled in the art that it is not limited to those embodiments, but may be embodied in many other forms.

Figure 7:
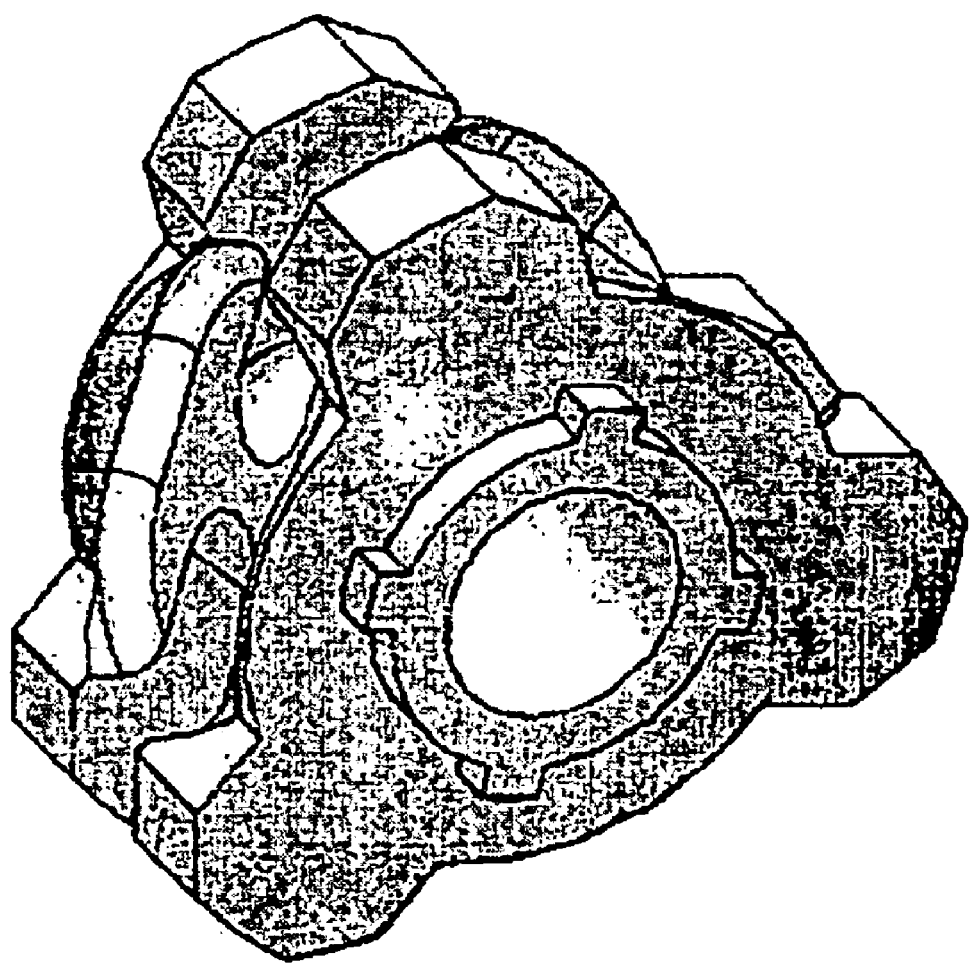
FIG. 7 is a schematic perspective view of an alternative form of chain sprocket to that shown in the binder of FIGS. 4 to 6.

For example, while the chain sprocket 42 shown in FIG. 6 has four chain-engaging lobes, in FIG. 7 there is shown an alternate form of chain sprocket having only three chain-engaging lobes.

The invention claimed is:

1. A load binder device comprising:
   a first connection means for connecting the device to a first attachment hook;
   a second connection means for connecting the device to a second attachment hook;
   an actuating lever comprising a lever lock pushing plate;
   a frame plate comprising a locking slot formation defined in the frame plate; and
   a ratchet mechanism which is connected to the actuating lever and which interconnects the first and second connection means, the ratchet mechanism having an operational condition in which it is configured to urge the first and second connection means towards each other on movement of the actuating lever in a first direction of movement, and to prevent movement of the first and second connection means apart from each other, and having a released condition in which the first and second connection means are free to move apart from each other,
   wherein the actuating lever is configured to be moved into an unlocking position and thereupon to cause the ratchet mechanism to be switched from its operational condition to its released condition; and wherein said locking slot is configured to receive the lever lock pushing plate when the actuating lever is in a parked position corresponding to an endpoint of movement of the actuating lever in a second direction opposite to the first direction, and thereby prevent movement of the actuating lever and the ratchet mechanism when the lever lock pushing plate is engaged in the locking slot while the actuating lever is in the parked position.

2. A load binder device according to claim 1, additionally comprising an elongate tensioning element for connecting one of the first and second connection means to the ratchet mechanism, the ratchet mechanism being configured, when in the operational condition, to exert a pulling force on part of the tensioning element to effect said urging of the first and second connection means towards each other.

3. A load binder device according to claim 2 wherein the tensioning element includes a chain.

4. A load binder device according to claim 3 wherein the ratchet mechanism comprises a chain sprocket for guiding the chain and for exerting said pulling force on said part of the chain.

5. A load binder device according to claim 1 wherein the ratchet mechanism further comprises:
a rotatable ratchet wheel having ratchet teeth with driving faces and trailing faces, the device being configured such that rotation of the ratchet wheel in a forward rotational direction effects said urging of the first and second connection means towards each other, and that rotation of the ratchet wheel in an opposite, reverse rotational direction enables the first and second connection means to move apart from each other; and
a locking element which is movable between an engagement position in which the ratchet mechanism is in its operational condition, and a disengagement position in which the ratchet mechanism is in its released condition, the locking element being biased towards its engagement position,
wherein the ratchet wheel is configured, on being rotated in said forward rotational direction, for said trailing faces to engage the locking element such that the locking element rides along the trailing faces, thereby moving the locking element towards the disengagement position, and on being urged in said reverse rotational direction, for a driving face to abut the locking element when it is in its engagement position, such that the locking element prevents rotation of the ratchet wheel in said reverse direction.

6. A load binder device according to claim 5, additionally comprising an elongate tensioning element for connecting one of the first and second connection means to the ratchet mechanism, the ratchet mechanism being configured, when in the operational condition, to exert a pulling force on part of the tensioning element to effect said urging of the first and second connection means towards each other.

7. A load binder device according to claim 6 wherein the tensioning element includes a chain, and wherein the ratchet mechanism comprises a chain sprocket for guiding said chain and for exerting said pulling force on said part of said chain.

8. A load binder comprising:
the load binder device according to claim 7; and
a pair of hooks, each hook being connected to a respective one of the first and second connection means.

9. A load binder device according to claim 5, further comprising a locking element spring for biasing the locking element towards the engagement position.

10. A load binder device according to claim 5 wherein the actuating lever includes an unlocking portion which is configured, when the actuating lever is moved into its unlocking position, to engage a part of the locking element and to move the locking element from its engagement position to its disengagement position.

11. A load binder device according to claim 10, further comprising a locking element spring for biasing the locking element towards the engagement position.

12. A load binder device according to claim 10 wherein said unlocking portion is in the form of a cam whereby said part of said locking element constitutes a cam follower.

13. A load binder device according to claim 10 wherein the lever lock pushing plate is movable between a first position in which it is configured to engage the teeth of the ratchet wheel and a second position in which it is clear of the teeth, the lever lock pushing plate being biased towards said first position and being configured, when the lever is moved in said first direction of movement, to engage a said driving face thereby to urge the ratchet wheel in said forward rotational direction, and when the lever is moved in a direction opposite to said first direction of movement, for the trailing faces to engage the lever lock pushing plate such that the lever lock pushing plate rides along the trailing faces thereby moving the lever lock pushing plate towards its second position.

14. A load binder device according to claim 13 wherein the actuating lever has a parked position corresponding to the full extent of movement of the lever in a direction opposite to said first direction of movement, and is configured to be releasably retained in said parked position by engagement of one of said driving faces with said lever lock pushing plate.

15. A load binder device according to claim 5 wherein the lever lock pushing plate is movable between a first position in which it is configured to engage the teeth of the ratchet wheel and a second position in which it is clear of the teeth, the lever lock pushing plate being biased towards said first position and being configured, when the lever is moved in said first direction of movement, to engage a said driving face thereby to urge the ratchet wheel in said forward rotational direction, and when the lever is moved in a direction opposite to said first direction of movement, for the trailing faces to engage the lever lock pushing plate such that the lever lock pushing plate rides along the trailing faces thereby moving the lever lock pushing plate towards its second position.

16. A load binder device according to claim 15 wherein the actuating lever has a parked position corresponding to the full extent of movement of the lever in a direction opposite to said first direction of movement, and is configured to be releasably retained in said parked position by engagement of one of said driving faces with said lever lock pushing plate.

17. A load binder comprising:
the load binder device according to claim 16; and
a pair of hooks, each hook being connected to a respective one of the first and second connection means.

18. A load binder comprising:
the load binder device according to claim 15; and
a pair of hooks, each hook being connected to a respective one of the first and second connection means.

19. A load binder comprising:
the load binder device according to claim 5; and
a pair of hooks, each hook being connected to a respective one of the first and second connection means.

20. A load binder comprising:
the load binder device according to claim 1; and
a pair of hooks, each hook being connected to a respective one of the first and second connection means.

* * * * *